United States Patent
Gailloux et al.

(10) Patent No.: US 8,279,848 B1
(45) Date of Patent: Oct. 2, 2012

(54) DETERMINING CHARACTERISTICS OF A MOBILE USER OF A NETWORK

(75) Inventors: Michael A. Gailloux, Overland Park, KS (US); Michael W. Kanemoto, Overland Park, KS (US); Geoff S. Martin, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1168 days.

(21) Appl. No.: 11/863,227

(22) Filed: Sep. 27, 2007

(51) Int. Cl.
*H04J 3/24* (2006.01)

(52) U.S. Cl. ............................................. 370/349

(58) Field of Classification Search .................. 370/310, 370/345, 349, 328, 329; 709/224, 246
See application file for complete search history.

(56) References Cited

U.S. PATENT DOCUMENTS

| | | | | |
|---|---|---|---|---|
| 5,710,884 | A * | 1/1998 | Dedrick | 709/217 |
| 6,519,235 | B1 * | 2/2003 | Kim et al. | 370/331 |
| 6,922,726 | B2 * | 7/2005 | Basson et al. | 709/227 |
| 7,454,195 | B2 * | 11/2008 | Lewis et al. | 455/412.1 |
| 7,463,620 | B2 * | 12/2008 | Wang et al. | 370/352 |
| 7,539,796 | B2 * | 5/2009 | Nowlan et al. | 710/72 |
| 7,551,913 | B1 * | 6/2009 | Chien | 455/411 |
| 7,616,592 | B2 * | 11/2009 | Hwang | 370/280 |
| 7,688,811 | B2 * | 3/2010 | Kubler et al. | 370/356 |
| 7,734,511 | B2 * | 6/2010 | Nemetz et al. | 705/26.42 |
| 7,739,335 | B2 * | 6/2010 | Siegel et al. | 709/206 |
| 7,739,658 | B2 * | 6/2010 | Watson et al. | 717/108 |
| 7,747,782 | B2 * | 6/2010 | Hunt et al. | 709/246 |
| 7,752,209 | B2 * | 7/2010 | Ramer et al. | 707/752 |
| 7,765,311 | B2 * | 7/2010 | Itabashi et al. | 709/229 |
| 7,769,764 | B2 * | 8/2010 | Ramer et al. | 707/751 |
| 7,827,314 | B2 * | 11/2010 | Gibbs et al. | 709/247 |
| 8,005,680 | B2 * | 8/2011 | Kommer | 704/275 |
| 8,065,698 | B2 * | 11/2011 | Glasgow et al. | 725/10 |
| 8,073,460 | B1 * | 12/2011 | Scofield et al. | 455/456.1 |
| 2002/0138286 | A1 * | 9/2002 | Engstrom | 705/1 |
| 2002/0138545 | A1 * | 9/2002 | Andreakis et al. | 709/200 |
| 2002/0184093 | A1 * | 12/2002 | Cherry et al. | 705/14 |
| 2002/0184183 | A1 * | 12/2002 | Cherry et al. | 707/1 |
| 2002/0191570 | A1 * | 12/2002 | Kim et al. | 370/335 |
| 2003/0088633 | A1 * | 5/2003 | Chiu et al. | 709/206 |
| 2004/0109434 | A1 * | 6/2004 | Hwang | 370/345 |
| 2005/0135596 | A1 * | 6/2005 | Zhao | 379/265.01 |
| 2007/0033102 | A1 * | 2/2007 | Frank et al. | 705/14 |
| 2007/0053513 | A1 * | 3/2007 | Hoffberg | 380/201 |
| 2007/0073799 | A1 * | 3/2007 | Adjali et al. | 709/200 |
| 2007/0195788 | A1 * | 8/2007 | Vasamsetti et al. | 370/395.21 |
| 2007/0206736 | A1 * | 9/2007 | Sprigg et al. | 379/88.21 |
| 2008/0175220 | A1 * | 7/2008 | Anderson et al. | 370/349 |
| 2008/0267117 | A1 * | 10/2008 | Stern | 370/329 |
| 2009/0296598 | A1 * | 12/2009 | Harvey et al. | 370/252 |
| 2010/0115060 | A1 * | 5/2010 | Julia et al. | 709/219 |
| 2010/0169176 | A1 * | 7/2010 | Turakhia | 705/14.52 |
| 2010/0332615 | A1 * | 12/2010 | Short et al. | 709/217 |

* cited by examiner

*Primary Examiner* — Chi Pham
*Assistant Examiner* — Robert Lopata

(57) ABSTRACT

Systems and methods are provided for determining characteristics of a mobile user of a network. The system includes a provider and a mobile device communicating with the provider. A communication with the provider includes a header having user characteristics. The provider is configured to determine a content to provide to the mobile device based on the user characteristics in the header.

20 Claims, 5 Drawing Sheets

DETERMINING CHARACTERISTICS OF A MOBILE USER OF A NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile devices include applications, such as web browsers, that can request content from providers, such as website servers. Content providers can enable advertisement providers to supplement the requested content with advertisements. In general, advertisement providers pay higher prices for advertisements that reach specific intended audiences because targeted advertisements increase the chances of favorable responses to the advertisement.

For example, an advertisement provider designs a music download advertisement for mobile device users. Mobile device users who previously downloaded music are likely to have sufficient interest and sufficient disposable income to respond favorably to the advertisement. However, the advertiser provider may not want to pay to send this advertisement to numerous mobile device users who have not downloaded music, for these mobile device users are not as likely to have sufficient interest to respond favorably to the advertisement. Therefore, advertisement providers would want to send such advertisements to targeted mobile device users.

SUMMARY

The present disclosure provides systems and methods for determining characteristics of a mobile user of a network. In some system embodiments, the system includes a provider and a mobile device communicating with the provider. A communication with the provider includes a header having user characteristics. The provider is configured to determine a content to provide to the mobile device based on the user characteristics in the header.

In some method embodiments, a mobile device communicates with a provider, wherein communication from the mobile device includes a header having user characteristics. A content is determined to provide to the mobile device based on the user characteristics in the header.

In some other method embodiments, user characteristics are provided to a mobile device. The mobile device communicates to a provider via the network, wherein a communication to the provider includes a header having the user characteristics. A content is determined to provide to the mobile device based on the user characteristics in the header.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure provides systems and methods for determining characteristics of a mobile user of a network. A network service server can provide a header for a mobile device to communicate with a provider, such as a content provider or an advertisement provider. The header includes user characteristics, such as the geographic location, demographics, and usage information for the mobile device and the mobile device's user. Alternatively, the network service server can provide the user characteristics to the mobile device, such that the mobile device can supply the user characteristics for the header when communicating with the provider.

In contrast to the provider requesting user characteristics from the network service server each time that a mobile device communicates with the provider, the network service server can enable the provider to interpret the user characteristics from the header. By shifting the identification of user characteristics from the network service server to the provider, the network service server load may be reduced. The present disclosure allows the provider to interpret user characteristics from the header so that the provider does not have to request the user characteristics from the network service server. Different providers may have different subscriptions that enable each provider to interpret different portions of the user characteristics based on the specific needs of each provider. The provider may determine the content, such as an advertisement, to provide to the mobile device based on the user characteristics identified from the header, such as usage information that indicates purchases made via the mobile device. The advertisement may be an advertisement inserted in content requested by the mobile device, a stand-alone advertisement sent at another time to the mobile device, or other content or advertisements. The provider can subscribe to the network service server to receive decryption keys and/ or user characteristics legends for decrypting and interpreting user characteristics. The network service server can occasionally revise the user characteristics and the user characteristics legends to induce providers to maintain current subscriptions. The network service server can also use a different encryption key to induce providers to keep subscriptions current.

Figure 1:
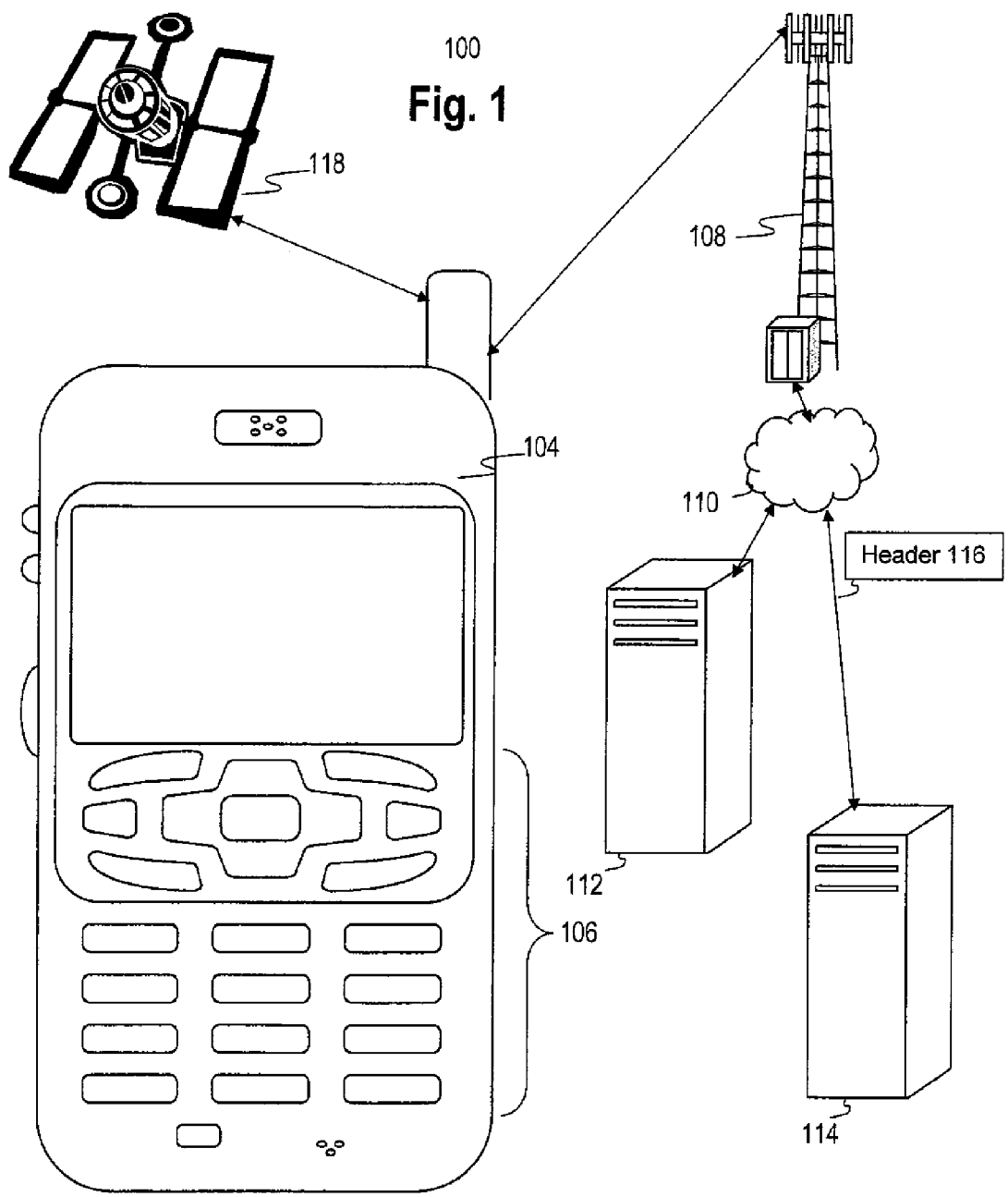
FIG. 1 shows a wireless communications system for determining characteristics of a mobile device user of a network according to some embodiments of the present disclosure.

FIG. 1 shows a wireless communications system 100 that illustrates the context for the present disclosure's systems and methods. The wireless communication system 100 includes an illustrative mobile device 102. Though illustrated as a mobile phone, the mobile device 102 may take various forms including a personal digital assistant (PDA), a mobile computer, a digital camera, a mobile phone or mobile communications device, and a digital music player. Many suitable mobile devices combine some or all of these functions.

The mobile device 102 includes a display 104 and a touch-sensitive surface or keys 106 with which the user can also interact. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. Among the various applications executable by the mobile device 102 are a web browser, which enables the display 104 to show a web page. These applications may configure the mobile device 102 to perform various customized functions in response to user interaction, such as accessing a web page.

The web page is obtained via wireless communications with a cell tower 108, a wireless network access node, or another wireless communications network or system.

The cell tower 108 (or wireless network access node) is coupled to the telecommunication network 110, such as the Internet. While one cell tower is shown in FIG. 1, other cell towers could be present. Via the wireless link and the wired network, the mobile device 102 has access to information on various servers, such as a network service server 112. The network service server 112 may provide content that may be shown on the display 104.

The network service server 112 in turn interacts with a provider server 114 through the network 110. While one provider server is shown in FIG. 1, other servers could be present. The network service server 112 may act as a gateway to the provider server 114, which provides information such as content and advertisements to transmit to the mobile device 102. Communications from the mobile device 102 to the provider server 114 use a header 116. In data packets sent by wireless communication, typically headers begin with a synchronization word to allow the receiver to adapt to analog amplitude and speed variations and for frame synchronization. In a data packet sent through the Internet, the data is preceded by information in headers such as the sender's and the recipient's internet protocol addresses, the protocol governing the format of the payload and several other formats. The header 116 is not necessarily related or associated with the internet protocol header. The header 116 may be part of a data package and may be ignored by internet protocol signal processing or similar level systems.

Using the header 116, the mobile device may communicate with the provider server 114 through the network 110 and the cell tower 108 by a standard wireless telephony protocol (such as code division multiple access), a wireless internet connection, or some other means of wireless communication. Although the network service server 112 and the provider server 114 are depicted separately in FIG. 1, the functions of the network service server 112 and the functions of the provider server 114 can be combined on one server, or other numbers of servers may be present.

The mobile device 102 may receive signals from a satellite 118. The mobile device 102 may use a global positioning system (GPS) technology or other well-known-positioning systems to determine a geographical position or location for the mobile device 102. Global positioning system satellites transmit signals that may be received by the mobile device 102. The mobile device 102 may determine its position based on the different signals received from different satellites.

Figure 2:
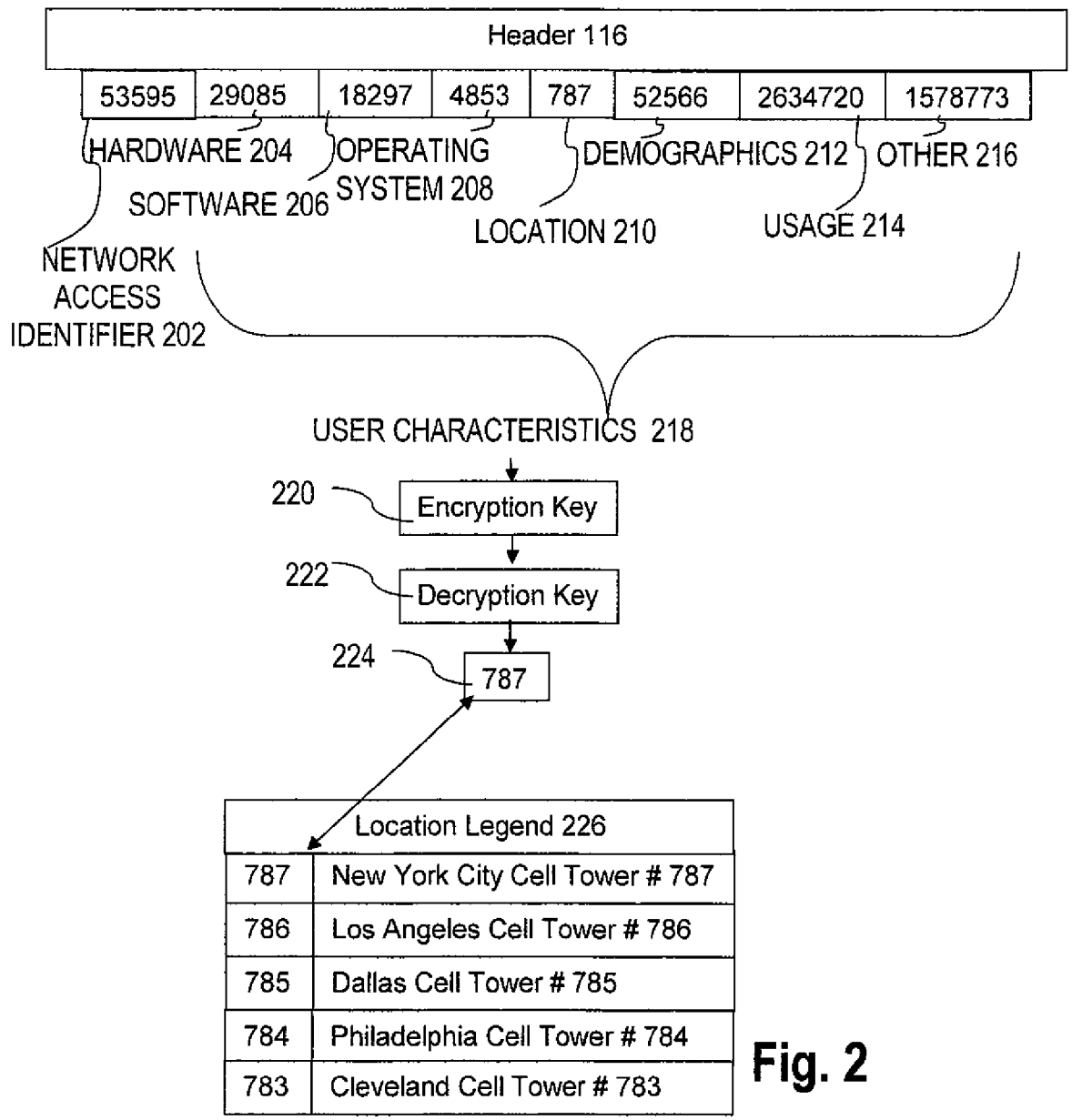
FIG. 2 shows a block diagram of a header and a legend for determining characteristics of a mobile device user of a network according to some embodiments of the present disclosure.

FIG. 2 shows a block diagram of the header 116 and a legend for determining characteristics of a mobile user of a network according to some embodiments of the present disclosure. The header 116 may include information such as a network access identifier 202, hardware 204, software 206, an operating system 208, a location 210, demographics 212, usage 214, and other 216 information. Specific information in the header 116, such as the information 204 to 214, may be referred to as user characteristics 218. The network access identifier 202 can be a unique identifier for the mobile device 102. The hardware 204 identifies the physical artifacts and/or capabilities of the mobile device 102. The software 206 identifies the programs that enable the mobile device 102 to perform certain tasks. The operating system 208 identifies a set of computer programs that manage the hardware and software resources of the mobile device 102.

The location 210 identifies a geographic location of the mobile device 102. A cell tower location technology may identify the location 210 of the mobile device 102 based on the cell tower 108 used by the mobile device 102 for communication. For example, the location 210 identifies "cell tower #787" as the cell tower 108 used by the mobile device 102 for communication.

The demographics 212 identify selected population characteristics as used in marketing research. Commonly-used demographics include race, age, income, educational attainment, ownership of various items, and employment status. A network service provider may already have some demographics for each mobile device user, and may offer a network service discount to each mobile device user that completes a demographic survey. The usage 214 identifies a history of mobile device 102 use, such as which web pages the mobile device 102 accessed, what purchases the mobile device 102 made using a web browser, and what media the mobile device 102 downloaded. The usage 214 may include past user behavior or actions of the mobile device 102, including, but not limited to, records or history of empirical data consumption of the mobile device 102. Additionally, the usage 214 may refer to only a portion of the identified usage history. The usage 214 may also be referred to as usage information. The other 216 information identifies any additional information stored in the header 116. The information stored in the header 116 is depicted for illustrative examples only, as the header can include any type of information.

The user characteristics 218 in the header 116 may be encrypted by an encryption key 220. After the encrypted user characteristics 218 are communicated as part of the header 116 in a communication, a decryption key 222 may be used to decrypt the user characteristics 218. The decrypted user characteristics 218 may be used to identify information for the user of the mobile device 102. For example, a decrypted location 224 identifies the geographic location of the mobile device 102. Due to the format of the information identified by the decrypted location 224, such as "787," a location legend 226 may be used to identify the geographic location of the mobile device 102. For example, the location legend 226 includes a row that includes the information "787," which is identified as a New York City cell tower #787. In this example, the location legend 226 enables the decrypted location 224 to identify the geographic location of the mobile device 102 based on the cell tower 108 through which the mobile device 102 is communicating. Similar legends (not shown) would exist for each of the other user characteristics 218 in the header 116. The legends may be supplied to providers as one or more tables.

Figure 3:
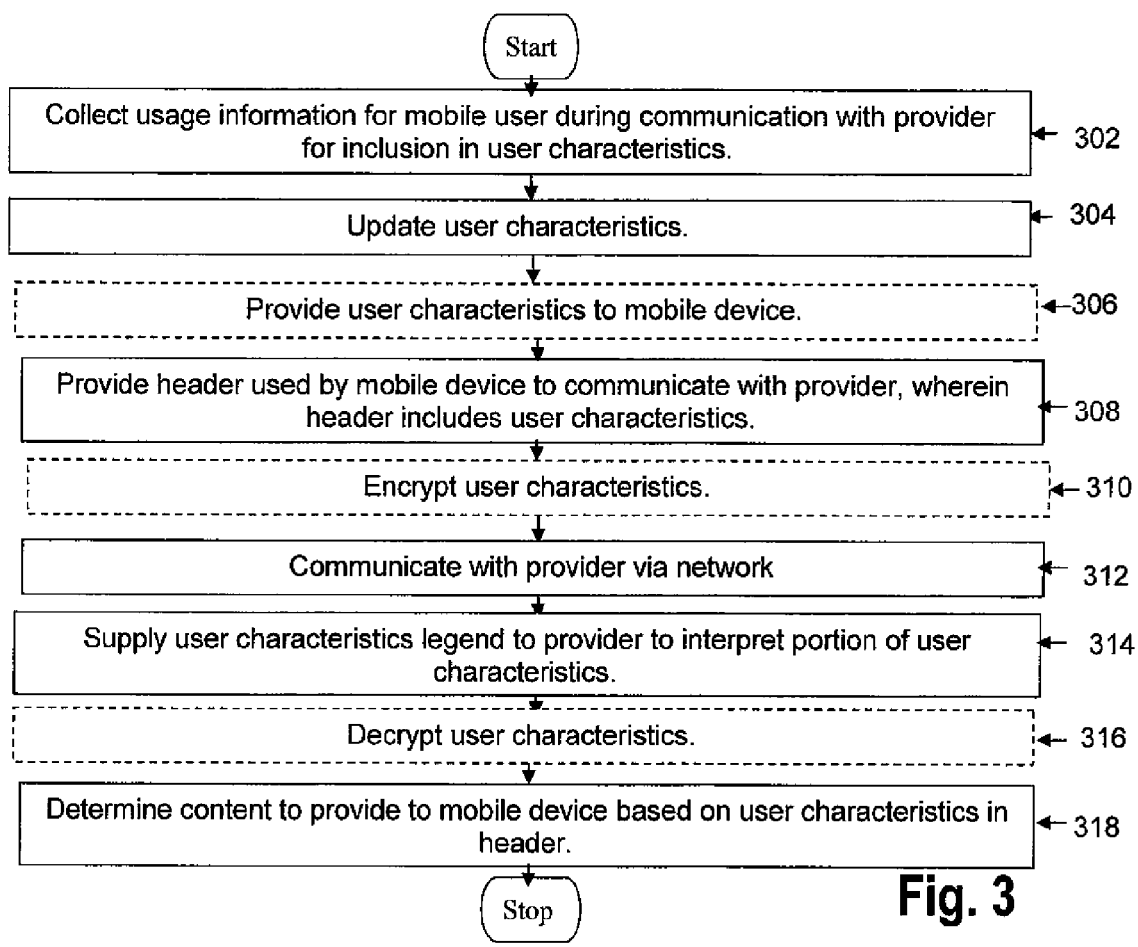
FIG. 3 shows a flowchart of a method for determining characteristics of a mobile device user of a network according to some embodiments of the present disclosure.

FIG. 3 is a flowchart illustrating a method for determining characteristics of a mobile user of a network according to some embodiments of the present disclosure. The provider server 114 can use the method to determine content to provide to the mobile device 102 based on the user characteristics 218 in the header 116.

In box 302, usage 214 information is collected for the mobile user during communication with the provider server 114 for inclusion in the user characteristics 218. For example, the network service server 112 collects usage 214 information for the mobile user when the mobile device 102 is using a web browser to communicate with the provider server 114. The network service server 112 may accumulate usage information, such as web pages accessed, purchases made, and items downloaded, over any period of time.

In box 304, the user characteristics 218 are updated. For example, the network service server 112 updates the user characteristics 218 by storing the usage 214 information in the user characteristics 218 that are included in the header 116.

In box 306, the user characteristics 218 are optionally provided to the mobile device 102. For example, the network service server 112 provides the user characteristics 218 to the mobile device 102, instead of creating the header 116 and including the user characteristics 218 in the header 116 when the mobile device 102 initiates a request to communicate with the provider server 114. By providing the user characteristics 218 to the mobile device 102 before receiving the request to communicate with the provider server 114, the network service server 112 does not have to provide the user characteristics 218 when creating the header 116. Instead, the mobile device 102 stores the user characteristics 218 and subsequently provides the user characteristics 218 with the request to communicate with the provider server 114. In this situation, the network service server 112 may only have to provide the time and effort required to generate and encrypt the header 116 for the mobile device 102. The network service server 112 may provide the user characteristics 218 to the mobile device 102 during off-peak hours, when the mobile device 102 is less likely to be communicating with the provider server 114, for example between midnight and 4 A.M. on a weekday.

In box 308, the header 116 used by the mobile device 102 is provided to communicate with the provider server 114, wherein the header 116 includes the user characteristics 218. For example, as an alternative to providing the user characteristics 218 to the mobile device 102 before receiving any request to communicate with the provider server 114, the network service server 112 provides the header 116 that includes the user characteristics 218 in response to the request by the mobile device 102 to communicate with the provider server 114. Therefore, the user characteristics 218 may be stored in the network service server 112, the mobile device 102, or any combination thereof before the mobile device's 102 request to communicate with the provider server 114.

In box 310, optionally the user characteristics 218 are encrypted. For example, the network service server 112 uses the encryption key 220 to encrypt the user characteristics 218.

The network service server 112 may encrypt the user characteristics 218 to prevent providers who are not subscribers and others from interpreting the user characteristics 218. For example, a non-subscribing provider may offer mobile device users an opportunity to register through a web page by submitting demographic information. After a number of registrations, the non-subscribing provider may notice that all mobile users who submit New York City as their residence also have "787" included as the $20^{th}$ through $22^{nd}$ digits in their headers. Through this reverse engineering, the non-subscribing provider may be able to interpret some user characteristics 218 from non-encrypted headers. By encrypting the header 116, the network service server 112 significantly reduces the possibility of such reverse engineering.

The network service server 112 may encrypt the user characteristics 218 based on another encryption key to prevent the provider server 114 from decrypting the user characteristics. For example, the network service server 112 may change encryption keys periodically in association with information service subscriptions. If the network service server 112 used only one encryption key continually, a previously-subscribed provider could use the corresponding decryption key previously provided through the previous subscription to decrypt the header 116 and reverse-engineer the user characteristics 218, as described above. By changing encryption keys periodically, the network service server 112 increases the incentive for providers to renew their subscriptions.

In box 312, the mobile device 102 communicates to the provider server 114 via the network 110. For example, the network service server 112 forwards a communication from the mobile device 102 to the provider server 114 via the network 110, where the communication uses the header 116 that includes the user characteristics 218.

In box 314, a user characteristics legend is supplied to the provider server 114 to interpret a portion of the user characteristics 218. For example, the network service server 112 supplies the location legend 226 to the provider server 114 to interpret the location 210 in the user characteristics 218. In this example, the provider server 114 may use the location legend 226 to interpret the location 210 so that the provider server 114 can select an advertisement to provide the mobile device 102 based on the geographic location of the mobile device 102.

The portion of the user characteristics 218 that the provider server 114 can interpret is based on a subscription to receive a user characteristics legend, whereas a different provider may interpret a different portion of the user characteristics 218 based on a different subscription. For example, one provider may have a subscription to receive the location legend 226 to select local advertisements to provide to the mobile device 102, whereas another provider may have another subscription to receive another user characteristics legend to interpret the usage 214 to select music download advertisements to provide to the mobile device 102. Any provider may review all of the types of user characteristics 218 that may be identified based on subscriptions to receive user characteristics legends, and subscribe to receive user characteristics legends that offer the most value to the specific provider. For example, a first provider that selects local advertisements based on interpreting the location 210 may decide to not subscribe to interpret the usage 214, a second provider that selects music download advertisements based on the usage 214 may decide to not subscriber to interpret the location 210, and a third provider may decide to subscribe to interpret all user characteristics 218, including both the location 210 and the usage 214. The types of user characteristics 218 that each provider may interpret based on a subscription are described for illustrative purposes only, as each provider may subscribe to interpret any combination of the user characteristics 218. Legends and decryption keys may be supplied to providers under different distribution or business models other than subscriptions.

The network service server 112 may modify the user characteristics 218 to prevent the provider server 114 from interpreting the user characteristics. For example, a provider that subscribed to receive the location legend 226 to interpret the location 210 may stop subscribing. The no longer subscribing provider would be able to interpret the location 210 using the previously received location legend 226 unless the network service server 112 modifies the user characteristics 218 such that the previously received location legend 226 no longer enables the provider to interpret the location 210. Therefore, the network service server 112 may occasionally revise the format in which the user characteristics 218 are stored in the header 116 and revise the corresponding user characteristics legends to enable identification of the revised user characteristics 218. The network service server 112 may provide the revised user characteristics legend to providers that continue to subscribe and to providers that have re-subscribed after a subscription lapse. Due to the desire to avoid supplying the user characteristics legend during times when the network service server 112 or the provider server 114 may be processing a high volume of information, the network service server 112 may provide the user characteristics legend to the provider server 114 during off-peak hours, for example between midnight and 4 A.M. on a weekday.

In box 316, the user characteristics 218 are decrypted. For example, the network service server 112 provides the decryption key 222 for the provider server 114 to use to decrypt the user characteristics 218. The decryption key 222 may enable the provider server 114 to decrypt all of the user characteristics 218 in the header 116. Alternatively, the decryption key 222 may enable the provider server 114 to decrypt only a portion of the user characteristics 218 in the header 116 based on the subscription for the provider server 114. Continuing this example, another provider may decrypt another portion of the user characteristics 218 based on another subscription. Due to the desire to avoid supplying the decryption key 222 during times when the network service server 112 or the provider server 114 may be processing a high volume of information, the network service server 112 may provide the decryption key 222 to the provider server 114 during off-peak hours, for example between midnight and 4 A.M. on a weekday. The network service server 112 does not have to communicate legends and/or keys to the provider server 114 every time that the mobile device 102 requests to communicate with the provider server 114. The network service server 112 may communicate legends and/or keys to the provider server 114 at controlled times, such as during the off-peak hours noted above in boxes 306 and 314, and in a coordinated manner.

In box 318, a content to provide to the mobile device 102 is determined based on the user characteristics 218 in the header 116. For example, the provider server 114 selects an advertisement for the mobile device 102 based on the user characteristics 218 in the header 116, and transmits the advertisement to the mobile device 102. The provider server 114 may provide content, such as airline flight times, to the mobile device 102 based on the network access identifier 202 that uniquely identifies the mobile device 102 and the usage 214 that identifies airline tickets purchased via the mobile device 102. Advertisements may be an advertisement displayed with requested content, such as a banner advertisement that is inserted in content that the mobile device 102 requested from a news organization web page. Advertisements may also be unsolicited advertisements, such as a stand-alone music download advertisement sent to the mobile device 102 when the mobile device 102 is not requesting content.

The provider server 114 may select an advertisement based on a location of the mobile device 102. For example, the provider server 114 designs an advertisement for mobile device users attending a football game. Additionally, the provider server 114 can evaluate if the demographics 212 for mobile device users currently determined to be at the football game matches the demographics for the designed advertisement. For example, the advertisement designed for the football game is specifically designed for males between the ages of 25 and 35.

The network service server 112 may transmit content to the mobile device 102. For example, the provider server 114 provides a uniform resource locator for the selected advertisement to the network service server 112, and then the network service server 112 transmits the content requested by the mobile device 102 along with the uniform resource locator (URL) for the selected advertisement to the mobile device 102. Alternatively, in some embodiments the provider server 114 provides the selected advertisement to the network service server 112, and then the network service server 112 transmits the content requested by the mobile device 102 along with the selected advertisement to the mobile device 102.

The provider server 114 may transmit the advertisement to the mobile device 102. For example, after the mobile device 102 receives the content requested by the mobile device 102 along with the URL for the selected advertisement, the mobile device 102 uses the URL for the selected advertisement to request the selected advertisement from the provider server 114, and then the provider server 114 transmits the selected advertisement to the mobile device 102. Alternatively, in some embodiments the provider server 114 indirectly transmits the selected advertisement to the mobile device 102 by providing the selected advertisement to the network service server 112, whereby the network service server 112 transmits the content requested by the mobile device 102 along with the selected advertisement to the mobile device 102.

Figure 4:
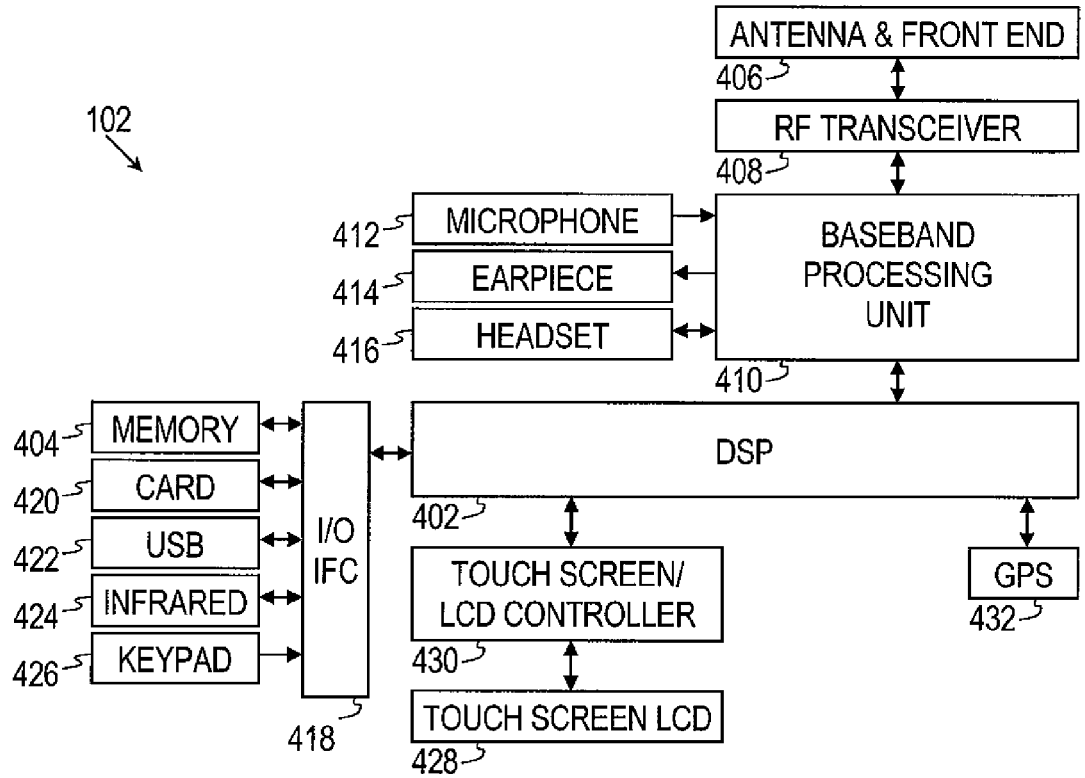
FIG. 4 shows a block diagram of an illustrative mobile device.

FIG. 4 shows a block diagram of the mobile device 102. The mobile device 102 includes a digital signal processor (DSP) 402 and a memory 404. As shown, the mobile device 102 may further include an antenna and front end unit 406, a radio frequency (RF) transceiver 408, a baseband processing unit 410, a microphone 412, an earpiece speaker 414, a headset port 416, an input/output interface 418, a memory card 420, a universal serial bus (USB) port 422, an infrared port 424, a keypad 426, a liquid crystal display (LCD) with a touch sensitive surface 428, a touch screen/LCD controller 430, and a global positioning system (GPS) sensor 432.

The DSP 402 or some other form of controller or central processing unit operates to control the various components of the mobile device 102 in accordance with embedded software or firmware stored in the memory 404. In addition to the embedded software or firmware, the DSP 402 may execute other applications stored in the memory 404 or made available via information carrier media such as portable data storage media like the memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402 to execute parts of the methods described above.

The antenna and front end unit 406 converts between wireless signals and electrical signals, enabling the mobile device 102 to send and receive information from a cellular network or some other available wireless communications network. The RF transceiver 408 may provide frequency shifting, e.g., converting received RF signals to baseband and converting baseband transmit signals to RF. The baseband processing unit 410 may provide channel equalization, decoding, and signal demodulation to extract information from received signals, and may code and modulate information to create transmit signals, and may provide filtering for signals. To that end, the baseband processing unit 410 includes ports for connecting to the built-in microphone 412 and the earpiece speaker 414 that enable the mobile device 102 to be used as a cell phone. The DSP 402 can also execute the baseband processing.

The DSP 402 can send and receive digital communications with a wireless network via the baseband processing unit 410. The input/output interface 418 interconnects the DSP 402 and various memories and interfaces. The memory 404 and the removable memory card 420 may provide software and data to configure the operation of the DSP 402. The infrared port 424 and other optional ports such as a Bluetooth interface or an IEEE 402.11 compliant wireless interface enable the mobile device 102 to communicate wirelessly with other nearby mobile devices 102 and/or wireless base stations. In some contemplated systems, the mobile device 102 is able to wirelessly exchange information at a point-of-sale when placed near a suitable transceiver.

The keypad 426 couples to the DSP 402 via the I/O interface 418 to provide one mechanism for the user to make selections, enter information, and otherwise provide input to the mobile device 102. Another input mechanism may be the touch screen display 428, which may also display text and/or graphics to the user. The display controller 430 couples the DSP 402 to the touch screen display 428.

The GPS sensor 432 is coupled to the DSP 402 to decode global positioning system signals, thereby providing at least one technology for the mobile device 102 to determine its location. Alternatively, GPS processing may be provided by a dedicated GPS chip or processor. Various other peripherals may also be included to provide additional functions, e.g., radio and television reception.

Figure 5:
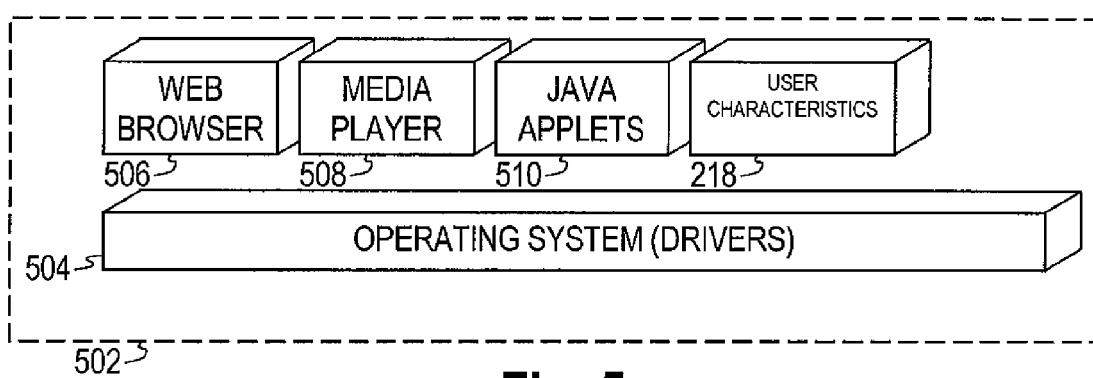
FIG. 5 shows a block diagram of an illustrative software configuration for a mobile device.

FIG. 5 illustrates a software environment 502 that may be implemented by the DSP 402. The DSP 402 executes operating system software 504 that provides a platform from which the rest of the software operates. The operating system generally provides processing resource management support. The operating system software 504 provides drivers for the mobile device hardware to make standardized interfaces available to application software. The operating system software 504 may transfer control between applications running on the mobile device 102. Also shown in FIG. 5 are a web browser 506 application, a media player 508, application JAVA applets 510, and the user characteristics 218. The web browser 506 application configures the mobile device 102 to operate as a web browser, allowing the user to enter information into forms and select links to retrieve and view web pages, including content from the provider server 114. The media player 508 application configures the mobile device 102 to retrieve and play audio or audiovisual media on its own output components. The JAVA applets 510 may configure the mobile device 102 to provide games, utilities, and other functionality on the mobile device 102. These are further examples of content that may be provided by the provider server 114.

Figure 6:
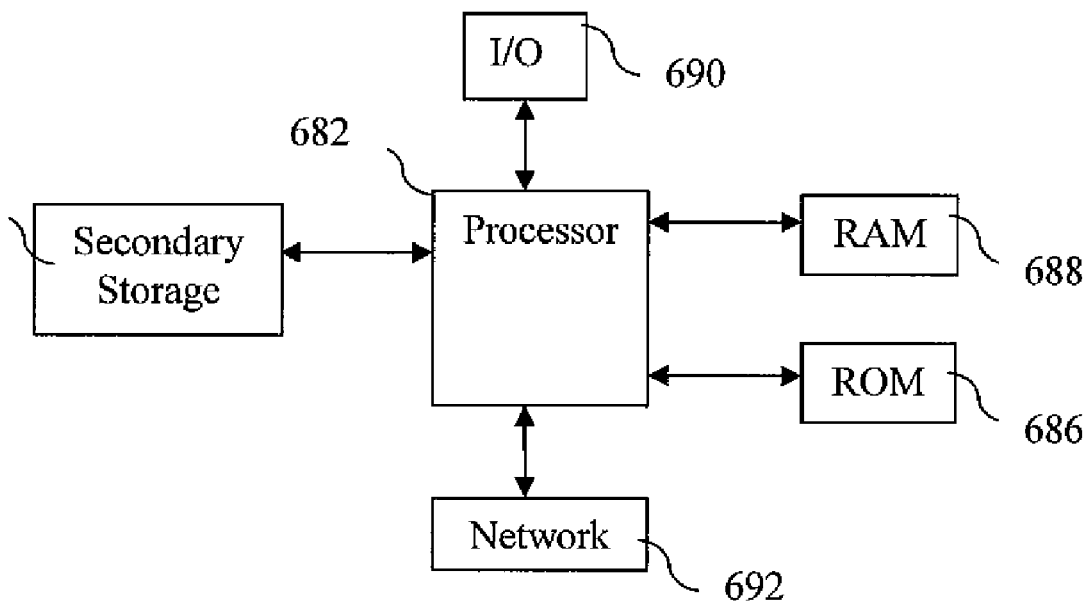
FIG. 6 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 6 illustrates a typical, general-purpose computer system, such as the provider server 114, suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor may be implemented as one or more CPU chips.

The secondary storage 684 is typically comprised of one or more disk drives or tape drives and is used for non-volatile storage of data and as an over-flow data storage device if the RAM 688 is not large enough to hold all working data. Secondary storage 684 may be used to store programs which are loaded into the RAM 688 when such programs are selected for execution. The ROM 686 is used to store instructions and perhaps data which are read during program execution. The ROM 686 is a non-volatile memory device which typically has a small memory capacity relative to the larger memory capacity of secondary storage. The RAM 688 is used to store volatile data and perhaps to store instructions. Access to both the ROM 686 and the RAM 688 is typically faster than to the secondary storage 684.

The I/O devices 690 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), worldwide interoperability for microwave access (WiMAX), and/or global system for mobile communications (GSM) radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using the processor 682, may be received from and outputted to the network, for example, in the form of a computer data signal embodied in a carrier wave.

Such information, which may include data or instructions to be executed using the processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered the secondary storage 684), the ROM 686, the RAM 688, or the network connectivity devices 692.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for determining characteristics of a mobile user of a network, comprising:
   a first provider; and
   a mobile device communicating with the first provider, wherein a communication with the first provider includes a header having user characteristics, wherein the user characteristics are based on usage information accumulated by a network service provider during mobile device communications, wherein the user characteristics are provided to the mobile device from the network service provider, wherein the first provider and the network service provider are different providers, and wherein the first provider is configured to determine a content to provide to the mobile device based on the user characteristics in the header.

2. The system of claim 1, further comprising a server to supply a user characteristics legend to the first provider for use to interpret at least a first portion of the user characteristics.

3. The system of claim 2, wherein the server is further configured to modify the user characteristics to prevent the first provider from interpreting the user characteristics.

4. The system of claim 3, further comprising another user characteristics legend, wherein the server is further configured to provide the other user characteristics legend to the first provider to interpret the user characteristics.

5. The system of claim 2, wherein the first portion of the user characteristics that the first provider can interpret is based on a first subscription.

6. The system of claim 5, further comprising a second provider to interpret a second portion of the user characteristics based on a second subscription.

7. The system of claim 6, wherein the second provider is further configured to decrypt the second portion of the user characteristics based on the second subscription.

8. The system of claim 1, further comprising:
   a first encryption key for use by a server to encrypt the user characteristics in the header; and
   a first decryption key for use by the first provider to decrypt the user characteristics in the header.

9. The system of claim 8, further comprising a second encryption key, wherein the server is further configured to encrypt the user characteristics based on the second encryption key to prevent the first provider from decrypting the user characteristics.

10. The system of claim 9, further comprising a second decryption key, wherein the server is further configured to provide the second decryption key to the first provider to decrypt the user characteristics.

11. The system of claim 1, further comprising a server to provide a decryption key and a user characteristics legend to the first provider during off-peak hours.

12. The system of claim 1, wherein the user characteristics comprise at least one of a hardware characteristic, a software characteristic, an operating system, a geographic location, demographics, and usage information.

13. The system of claim 1, wherein the mobile device is one of a mobile telecommunication device, a mobile handset, a personal digital assistant, a mobile computer, a handheld gaming device, a wireless mobile device, a pager, a digital camera, a digital music player, and a digital calculator.

14. A computer implemented method for determining characteristics of a mobile user of a network, comprising:
   receiving, at a provider, a mobile device communication, wherein the mobile device communication includes a header having user characteristics, wherein the user characteristics are based on usage information accumulated by a network service provider during mobile device communications, wherein the header is provided by the network service provider in response to a request by the mobile communication device to provide the mobile device communication to the provider, wherein the provider and the network service provider are different providers, and wherein the user characteristics comprise at least one of: a hardware characteristic, a software characteristic, an operating system, demographic information, or usage information; and
   determining a content to provide to the mobile device based on the user characteristics in the header.

15. The computer implemented method of claim 14, further comprising collecting, by the network service provider, usage information for a user of the mobile device during a communication with the provider for inclusion in the user characteristics.

16. The computer implemented method of claim 14, further comprising updating the user characteristics.

17. A computer implemented method for determining characteristics of a mobile user of a network, comprising:
   providing user characteristics to a mobile device from a network service provider, wherein the user characteristics are based on usage information accumulated by the network service provider during mobile device communications;
   receiving, at a provider, a communication from the mobile device via the network, wherein the communication includes a header having the user characteristics, wherein the provider and the network service provider are different providers;
   receiving, at the provider, a user characteristics legend;
   interpreting, at the provider, at least a first portion of the user characteristics in the header using the user characteristics legend; and determining a content to provide to the mobile device based on the interpreted user characteristics in the header.

18. The computer implemented method of claim 17, wherein the provider is at least one of an advertisement provider and a content provider.

19. The computer implemented method of claim 17, wherein the content is a selected advertisement transmitted to the mobile device based on the user characteristics and the mobile device is one of a portable computer, a tablet computer, and a laptop computer.

20. The computer implemented method of claim 19, wherein the advertisement is one of an unsolicited advertisement and an advertisement displayed with requested content.

* * * * *